United States Patent
Tsujie (10) Patent No.: US 10,092,970 B2
(45) Date of Patent: Oct. 9, 2018

(54) TITANIUM-COPPER ALLOY HAVING PLATING LAYER

(71) Applicant: JX Nippon Mining & Metals Corporation, Tokyo (JP)

(72) Inventor: Kenta Tsujie, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 14/983,922

(22) Filed: Dec. 30, 2015

(65) Prior Publication Data

US 2016/0199929 A1 Jul. 14, 2016

(30) Foreign Application Priority Data

Jan. 9, 2015 (JP) ................... 2015-003678

(51) Int. Cl.
*G03B 17/00* (2006.01)
*B23K 1/00* (2006.01)
*B23K 1/19* (2006.01)
*C22C 9/00* (2006.01)
*B23K 103/12* (2006.01)

(52) U.S. Cl.
CPC ............ *B23K 1/0016* (2013.01); *B23K 1/19* (2013.01); *C22C 9/00* (2013.01); *B23K 2203/12* (2013.01)

(58) Field of Classification Search
USPC .......................................................... 396/85
See application file for complete search history.

(56) References Cited

U.S. PATENT DOCUMENTS

| | | | |
|---|---|---|---|
| 4,767,508 A | 8/1988 | Arakida et al. | |
| 8,182,932 B2* | 5/2012 | Hatano | B32B 15/01 428/647 |
| 9,435,016 B2* | 9/2016 | Sakurai | C22C 9/06 |
| 2005/0196634 A1* | 9/2005 | Abe | C25D 5/14 428/615 |
| 2006/0180293 A1* | 8/2006 | Maehara | B22D 11/004 164/459 |

(Continued)

FOREIGN PATENT DOCUMENTS

| | | |
|---|---|---|
| EP | 2 551 384 A1 | 1/2013 |
| JP | 6-264202 | 9/1994 |

(Continued)

OTHER PUBLICATIONS

Brener, et al., Deposition of Nickel and Cobalt by Chemical Reduction, Journal of Research of the National Bureau of Standards, Research Paper RP1835, vol. 39, Nov. 1947.*

(Continued)

*Primary Examiner* — Rodney Fuller
(74) *Attorney, Agent, or Firm* — Marshall, Gerstein & Borun LLP (57) ABSTRACT

There is provided a titanium-copper alloy in which the adhesion strength with solder can be increased. The titanium-copper alloy comprises a base material and a plating layer provided on a surface of the base material, wherein the base material contains 1.5 to 5.0% by mass of Ti with a balance consisting of copper and unavoidable impurities, and the plating layer is selected from the group consisting of a Ni plating layer, a Co plating layer, and a Co—Ni alloy plating layer.

11 Claims, 3 Drawing Sheets

(56) References Cited

U.S. PATENT DOCUMENTS

| | | | | |
|---|---|---|---|---|
| 2008/0149297 | A1* | 6/2008 | Nakai | C23C 2/00 |
| | | | | 164/418 |
| 2009/0202861 | A1* | 8/2009 | Mihara | C22C 9/00 |
| | | | | 428/670 |
| 2009/0229715 | A1* | 9/2009 | Takahashi | C22C 9/00 |
| | | | | 148/576 |
| 2010/0098394 | A1* | 4/2010 | Ishihara | G02B 27/646 |
| | | | | 396/55 |
| 2012/0162793 | A1* | 6/2012 | Huang | H02K 41/0356 |
| | | | | 359/824 |
| 2013/0004793 | A1* | 1/2013 | Kuwagaki | B24B 37/044 |
| | | | | 428/675 |
| 2016/0183380 | A1* | 6/2016 | Ishii | B32B 15/08 |
| | | | | 428/601 |

FOREIGN PATENT DOCUMENTS

| | | |
|---|---|---|
| JP | 2004-280031 A | 10/2004 |
| JP | 2006-241573 | 9/2006 |
| JP | 2008-95186 | 4/2008 |
| JP | 2009-115895 A | 5/2009 |
| JP | 2009-242926 | 10/2009 |
| JP | 2011-195927 | 10/2011 |
| JP | 2012-007242 | 1/2012 |
| JP | 2014-037613 A | 2/2014 |
| JP | 2014-080670 A | 5/2014 |
| WO | WO-2009/123136 A1 | 10/2009 |

OTHER PUBLICATIONS

Office Action in KR Application No. 2015-0189395 dated Sep. 6, 2016, 6 pages.

Office Action in JP Application No. 2015-003678 dated Jun. 30, 2015, 3 pages.

Liu et al., "Hydrothermal Growth of CoNi-Based Nanocoatings on Copper Substrate", Journal of Dalian Jiaotong University, vol. 33, No. 2, 2012, pp. 62-67.

Office Action in CN Application No. 201610007345.9 dated Dec. 27, 2017, 7 pages.

* cited by examiner

TITANIUM-COPPER ALLOY HAVING PLATING LAYER

BACKGROUND OF THE INVENTION

Field of the Invention

The present invention relates to a titanium-copper alloy having a plating layer. The present invention particularly relates to titanium-copper foil suitable as a conductive spring material for autofocus camera modules (AFM).

Description of the Related Art

An electronic component called an autofocus camera module (AFM) is used in the camera lens part of a mobile phone. With respect to the autofocus function of the camera of a mobile phone, the lens is moved in a fixed direction by the spring force of a material used in AFM, while it is moved in the direction opposite to the direction in which the spring force of the material works by the electromagnetic force generated by passing current through a coil wound on the surroundings. The camera lens is driven by such a mechanism to exhibit autofocus function (for example, Japanese Patent Laid-Open Nos. 2004-280031 and 2009-115895).

Therefore, the copper alloy foil used in AFM needs strength that can endure the material deformation by the electromagnetic force. If the strength is low, the material cannot endure the displacement by the electromagnetic force, producing permanent deformation (permanent set). If the permanent set is produced, the lens cannot move to a desired position and autofocus function is not exhibited when a certain current is passed.

Cu—Ni—Sn-based copper alloy foil having a foil thickness of 0.1 mm or less and a 0.2% yield strength of 1100 MPa or more has been used for the spring material for AFM. However, by the cost reduction requirement in recent years, titanium-copper foil having a relatively lower material cost than the Cu—Ni—Sn-based copper alloy has come to be used, and the demand is increasing.

Under such a background, various titanium-copper alloys suitable as a spring material for AFM have been proposed. For example, in order to improve the 0.2% yield strength and permanent set resistance of titanium-copper foil, Japanese Patent Laid-Open No. 2014-80670 proposes titanium-copper foil containing 1.5 to 5.0% by mass of Ti with the balance consisting of copper and unavoidable impurities, having a 0.2% yield strength in the direction parallel to rolling direction of 1100 MPa or more, and satisfying the relation of I(220)/I(311) □15, where $I_{(220)}$ and $I_{(311)}$ represent the integrated intensity of a (220) plane and a (311) plane, respectively, which are measured using the X-ray diffraction on the rolling surface. Further, for the purpose of improving permanent set resistance, Japanese Patent Laid-Open No. 2014-37613 proposes titanium-copper foil containing 1.5 to 5.0% by mass of Ti with the balance consisting of copper and unavoidable impurities, having a 0.2% yield strength in the direction parallel to the rolling direction of 1100 MPa or more, and having an arithmetic average roughness (Ra) in the direction orthogonal to the rolling direction of 0.1 μm or less.

On the other hand, a method involving subjecting titanium-copper foil to shape-processing by etching has been employed in the process of producing a spring material for AFM from titanium-copper foil. The resulting spring material is joined to a coil through solder. However, the titanium-copper foil for AFM have been developed mainly for improving strength and permanent set resistance without consideration of adhesion with solder. According to the investigation results by the present inventor, since the adhesion strength of a joined part between solder and titanium-copper foil is low, it is also an important object to improve the adhesion strength of the joined part to increase the reliability of the joined part. Further, when application to AFM is taken into consideration, it is desirable that titanium-copper foil be excellent not only in adhesion strength with solder but also in etching properties.

In view of the above circumstances, an object of the present invention is to provide a titanium-copper alloy which can increase the adhesion strength with solder. Preferably, an object of the present invention is to provide a titanium-copper alloy having not only high adhesion strength with solder but also excellent etching properties.

SUMMARY OF THE INVENTION

Since a titanium-copper alloy comprises Ti, which is an active element, it is easily surface-oxidized. It has been known that when the surface is oxidized, soldering properties is reduced, but it has now been found that in the case of a titanium-copper alloy, sufficient solder adhesion is still not obtained even if an oxide film on the surface is removed. Further, in view of the fact that copper itself has high adhesion strength with solder, low adhesion strength of a titanium-copper alloy with solder is probably caused by titanium. The present inventor has investigated the reason why the adhesion strength between a titanium-copper alloy and solder is low based on such a point of view. As a result, it has been found that a diffusion layer of Cu—Sn—Ti is formed by the heat from soldering to a titanium-copper alloy and that the diffusion layer causes significant reduction in adhesion.

The present inventor has studied application of surface treatment to a titanium-copper alloy, considering that it is effective in improvement in solder adhesion to prevent the formation of the diffusion layer. As a result, it has been found that solder adhesion is significantly improved by forming Ni plating, Co plating, or Ni—Co alloy plating on the surface of the titanium-copper alloy. Further, it has been found that excellent etching properties can be secured by incorporating Co into the plating film, which is advantageous when a spring material for AFM is obtained by subjecting titanium-copper foil to shape-processing by etching.

The present invention has been completed based on the above findings and, in one aspect, provides a titanium-copper alloy comprising a base material and a plating layer provided on a surface of the base material, wherein the base material contains 1.5 to 5.0% by mass of Ti with a balance consisting of copper and unavoidable impurities, and the plating layer is selected from the group consisting of a Ni plating layer, a Co plating layer, and a Co—Ni alloy plating layer.

In one embodiment of the titanium-copper alloy according to the present invention, the plating layer is a Co plating layer or a Co—Ni alloy plating layer.

In another embodiment of the titanium-copper alloy according to the present invention, the plating layer is a Co—Ni alloy plating layer.

In further another embodiment of the titanium-copper alloy according to the present invention, the content of Co in the Co—Ni alloy plating layer is 50% by mass or more.

In further another embodiment of the titanium-copper alloy according to the present invention, the thickness of the plating layer is 0.03 μm or more.

In further another embodiment of the titanium-copper alloy according to the present invention, the base material further contains one or more elements selected from the group consisting of Ag, B, Co, Fe, Mg, Mn, Mo, Ni, P, Si, Cr, and Zr in a total amount of 0 to 1.0% by mass.

In further another embodiment of the titanium-copper alloy according to the present invention, the base material is in a form of foil having a thickness of 0.1 mm or less.

In another aspect, the present invention provides an electronic component comprising the titanium-copper alloy according to the present invention.

In further another aspect, the present invention provides a joined body of the titanium-copper alloy according to the present invention and solder, wherein the joined body has a joined part with solder on a surface of the plating layer of the titanium-copper alloy.

In further another aspect, the present invention provides a method for connecting a titanium-copper alloy to a conductive member, the method comprising the steps of: subjecting a titanium-copper alloy in the form of foil to shape-processing by etching; and joining the resulting shape-processed article of the titanium-copper alloy to a conductive member by soldering at a portion having the plating layer.

In further another aspect, the present invention provides an autofocus module comprising the titanium-copper alloy according to the present invention as a spring material.

In further another aspect, the present invention provides an autofocus camera module comprising: a lens; a spring member made of the titanium-copper alloy according to the present invention which elastically urges the lens toward an initial position in an optical axis direction; and an electromagnetic drive means which generates electromagnetic force to resist the urging force of the spring member, thereby capable of driving the lens in the optical axis direction, wherein the electromagnetic drive means has a coil, and the spring member is joined to the coil by soldering at a portion having the plating layer.

Advantage of the Invention

According to the present invention, low adhesion strength with solder, which has been a problem of a titanium-copper alloy, can be improved, and an adhesion strength 10 times or more, further 40 times or more as large as that of a conventional one can be obtained by optimizing plating thickness. Further, although Ni plating contributes to improvement in adhesion with solder, etching properties are poor. However, a titanium-copper alloy which has not only high adhesion strength with solder but also excellent etching properties can be provided by incorporating Co into a plating film. Therefore, the titanium-copper alloy according to a preferred embodiment of the present invention can be suitably used also as a spring material for AFM in which both shape-processing by etching and solderability are required.

DETAILED DESCRIPTION OF THE PREFERRED EMBODIMENTS (1) Ti Concentration

In the titanium-copper alloy having a plating layer according to the present invention, a titanium-copper alloy having the composition containing 1.5 to 5.0% by mass of Ti with the balance consisting of copper and unavoidable impurities can be used as a base material. The unavoidable impurities can be defined as impurities in metal products in general, which are present in a raw material or inevitably mixed in a production step. These impurities are basically unnecessary, but are permitted since they are present in a very small amount and do not affect the characteristics of metal products. Further, the total amount of the unavoidable impurities is generally 50 ppm or less, typically 30 ppm or less, more typically 10 ppm or less. The strength and electric conductivity of a titanium-copper alloy can be increased by dissolving Ti in a Cu matrix by solution treatment and dispersing fine deposits in the alloy by aging treatment. If the Ti concentration is less than 1.5% by mass, the deposition of the deposits will be insufficient, and a desired strength will not be obtained. If the Ti concentration is more than 5.0% by mass, the processability will deteriorate, and the material will be easily cracked in the rolling. When the balance of strength and processability is taken into consideration, preferred Ti concentration is 2.9 to 3.5% by mass.

(2) Other Additive Elements

Further, the strength can be further improved by incorporating one or more selected from the group consisting of Ag, B, Co, Fe, Mg, Mn, Mo, Ni, P, Si, Cr, and Zr into a base material in a total amount of 0 to 1.0% by mass. The total content of these elements may be zero, that is, these elements need not be contained. The reason why the upper limit of the total content of these elements has been set to 1.0% by mass is as follows: if the total content is more than 1.0% by mass, processability will deteriorate, and thus the material will be easily cracked in the rolling. When the balance of strength and processability is taken into consideration, it is preferred to incorporate one or more of the above elements in a total amount of 0.005 to 0.5% by mass.

(3) 0.2% Yield Strength

The 0.2% yield strength required for a titanium-copper alloy suitable as a conductive spring material of an autofocus camera module is 1100 MPa or more, while the titanium-copper alloy according to the present invention can achieve a 0.2% yield strength in the direction parallel to the rolling direction of 1100 MPa or more. The 0.2% yield strength of the titanium-copper alloy according to the present invention is 1200 MPa or more in a preferred embodiment, and is 1300 MPa or more in a more preferred embodiment.

The upper limit of the 0.2% yield strength is not particularly limited in terms of the target strength of the present invention. However, the 0.2% yield strength of the titanium-copper alloy according to the present invention is generally 2000 MPa or less, typically 1600 MPa or less, since time and effort and expense are required for obtaining higher strength.

In the present invention, the 0.2% yield strength in the direction parallel to the rolling direction of a titanium-copper alloy is measured according to JIS Z2241 (Method of Tensile Test for Metallic Materials).

(4) Form of Titanium-Copper Alloy

The base material of the titanium-copper alloy having a plating layer according to the present invention is typically provided in the form of foil having a thickness of 0.1 mm or less. The foil thickness may be 0.08 to 0.03 mm, and in a typical embodiment, the foil thickness may be 0.05 to 0.03 mm. The base material of a titanium-copper alloy may also be in a form other than foil. For example, the base material may also be in a plate shape having a thickness of more than 0.1 mm, and may be in the form of various wrought copper and copper alloy products, such as a tube, a rod, and a wire. Further, the base material of a titanium-copper alloy can be processed into a desired shape after being plated. For example, when the titanium-copper alloy having a plating layer according to the present invention is used as a spring material for autofocus modules, the titanium-copper alloy in the form of foil can be processed into a desired shape, for example, a circuit portion and a spring portion can be formed by etching. The shape-processing by etching itself can be performed by a known technique, and examples of the known technique include a method including protecting a portion desired to be left after etching of the surface of a base material with an etching resist, performing shape-processing by dry etching or wet etching, and then removing the resist.

(5) Plating Layer

The titanium-copper alloy having a plating layer according to the present invention has a plating layer selected from the group consisting of a Ni plating layer, a Co plating layer, and a Co—Ni alloy plating layer on the surface as one of the features. Although the present invention is not intended to be limited by any theory, it is believed that the formation of a diffusion layer of Cu—Sn—Ti when a titanium-copper alloy and solder are joined by heating is effectively prevented by providing a plating layer containing Ni or Co, which improves solder adhesion.

Further, it is preferred to incorporate Co into the plating layer from the point of view of also increasing etching properties. Ni is an element which has high corrosion resistance and is hardly etched, and therefore formation of a uniform circuit is difficult because a base material will also be etched in a case where the corrosion during etching concentrates in one portion. On the other hand, although the present invention is not intended to be limited by any theory, it is believed that since Co has a normal electrode potential that is close to that of Ni among less noble metals than Ni, Co easily forms an alloy plating, and that since Co shares many common chemical features with Ni, it is possible to improve etching properties by incorporating Co into the plating layer. Therefore, in a preferred embodiment of the titanium-copper alloy having a plating layer according to the present invention, the plating layer is a Co plating layer or a Co—Ni alloy plating layer.

However, since Co is an expensive metal, a single plating layer of Co will have a relatively high cost. Further, a Co—Ni alloy plating also can secure sufficient etching properties. Therefore, when solder adhesion, etching properties, and economical efficiency are comprehensively taken into consideration, it is more preferred that the plating layer be a Co—Ni alloy plating layer. In the Co—Ni alloy plating layer, the content of Co is preferably 20% by mass or more, more preferably 50% or more, further preferably 60% by mass or more, from the point of view of etching properties. The content of Co is preferably 90% by mass or less, more preferably 80% or less, from the point of view of cost.

Note that although unavoidable impurities may be contained in a Ni plating layer, a Co plating layer, and a Co—Ni alloy plating layer, the unavoidable impurities will not influence characteristics when they are at a level that is contained under common plating conditions. Therefore, unavoidable impurities at a level that will not influence characteristics may be incorporated into plating. Further, it is also possible to incorporate other elements into a plating layer as long as they do not impair the object of the present invention. Therefore, in the present invention, a Ni plating layer means a plating layer in which Ni occupies 50% by mass or more. The Ni concentration in the Ni plating layer is 60% by mass or more, typically 80% by mass or more, more typically 90% by mass or more, further more typically 98% by mass or more, and may be 100% by mass. Further, in the present invention, a Co plating layer means a plating layer in which Co occupies 50% by mass or more. The Co concentration in the Co plating layer is 60% by mass or more, typically 80% by mass or more, more typically 90% by mass or more, further more typically 98% by mass or more, and may be 100% by mass. Further, in the present invention, a Co—Ni alloy plating layer means a plating layer in which the total concentration of Co and Ni occupies 50% by mass or more. The total concentration of Co and Ni in the Co—Ni plating layer is 60% by mass or more, typically 80% by mass or more, more typically 90% by mass or more, further more typically 98% by mass or more, and may be 100% by mass.

The plating layer may be formed on a part or all of a base material surface. Further, the plating layer may be formed on one or both surfaces of the main surfaces of a base material. In one embodiment of the titanium-copper alloy according to the present invention, the plating layer may be formed on one or both of the main surfaces of a foil provided as a base material of a titanium-copper alloy. The plating layer can be obtained by wet plating such as electroplating, electroless plating, and immersion plating. The electroplating is preferred in terms of cost.

(6) Thickness of Plating Layer

The thickness of a plating layer has large influence on adhesion strength with solder. According to the investigation results by the present inventor, the adhesion strength with solder increases as the thickness of the plating layer increases, and significantly increases when the thickness is 0.03 μm or more. When the thickness of the plating layer increases to 0.03 μm or more, solder adhesion strength can be increased to 10 times or more as compared with the solder adhesion when the plating layer is not provided. The thickness of the plating layer is preferably 0.06 μm or more, more preferably 0.1 μm or more. However, as the thickness of the plating layer is increased from 0.1 μm, the improvement effect of solder adhesion will be saturated, and also etching properties may be reduced. Therefore, the thickness of a plating layer is preferably 5 μm or less, more preferably 1 μm or less.

In the present invention, the thickness of the plating layer is measured according to fluorescent X-ray spectrometric methods of JIS H8501 (1999). In examples, the thickness was measured using a fluorescent X-ray thickness meter manufactured by Hitachi High-Tech Science Systems Corp. (model: SFT9250).

(7) Applications

The titanium-copper alloy having a plating layer according to the present invention can be suitably used as, but is not limited to, a material for electronic components, such as a switch, a connector (in particular, a fork-type FPC connector which does not require severe bendability), an autofocus camera module, a jack, a terminal, and a relay. Further, a printed circuit board can also be produced by providing a titanium-copper alloy having a plating layer according to the present invention as foil, laminating an insulated substrate to the foil so that a plating layer may be exposed to form a copper-clad laminate, forming wiring through an etching step to thereby prepare a printed wiring board, and mounting various electronic components by soldering on the metallic wiring of the printed wiring board.

Particularly, the titanium-copper alloy having a plating layer according to the present invention can be suitably used as a spring material for autofocus modules. Therefore, in one aspect, the present invention provides an autofocus module comprising the titanium-copper alloy according to the present invention as a spring material. A typical autofocus module comprises a lens; a spring member made of a titanium-copper alloy having a plating layer according to the present invention which elastically urges the lens toward the initial position in the optical axis direction; and an electromagnetic drive means which generates electromagnetic force to resist the urging force of the spring member, thereby capable of driving the lens in the optical axis direction. The electromagnetic drive means can comprise, for example, a U-shaped cylindrical yoke, a coil received inside the inner circle wall of the yoke, and a magnet which surrounds the coil and is received inside the outer circle wall of the yoke. The spring member can be joined to the coil (typically a lead wire of the coil) by soldering at a portion having the plating layer.

Figure 1:
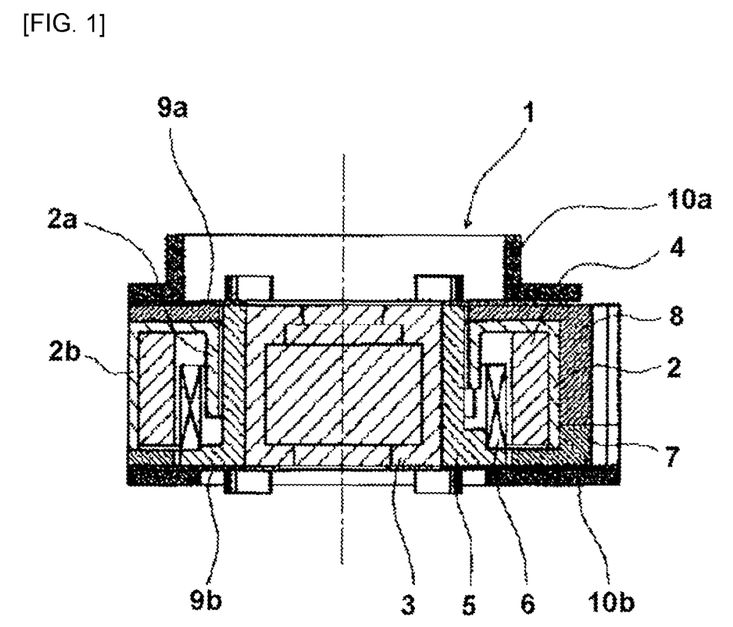
FIG. 1 is a sectional view showing the autofocus camera module according to the present invention.
Figure 2:
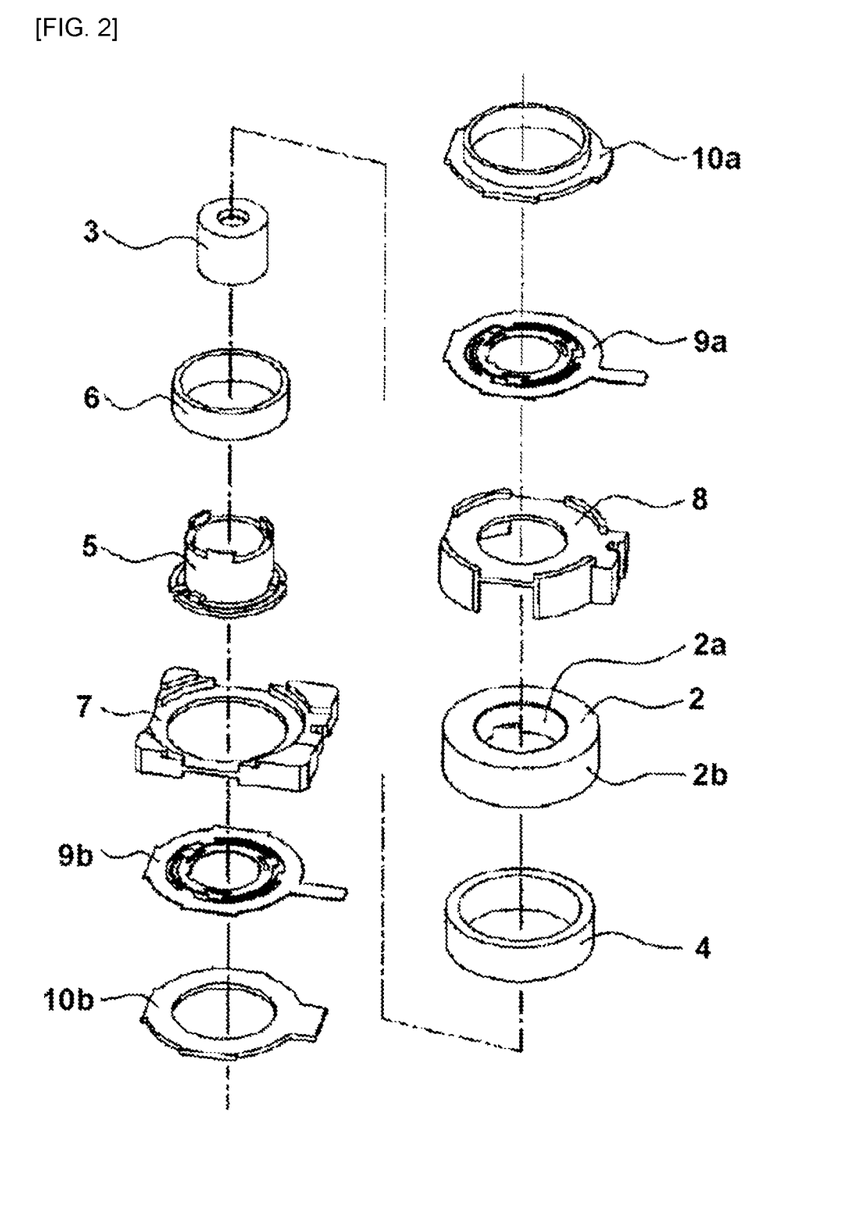
FIG. 2 is an exploded perspective view of the autofocus camera module of FIG. 1.
Figure 3:
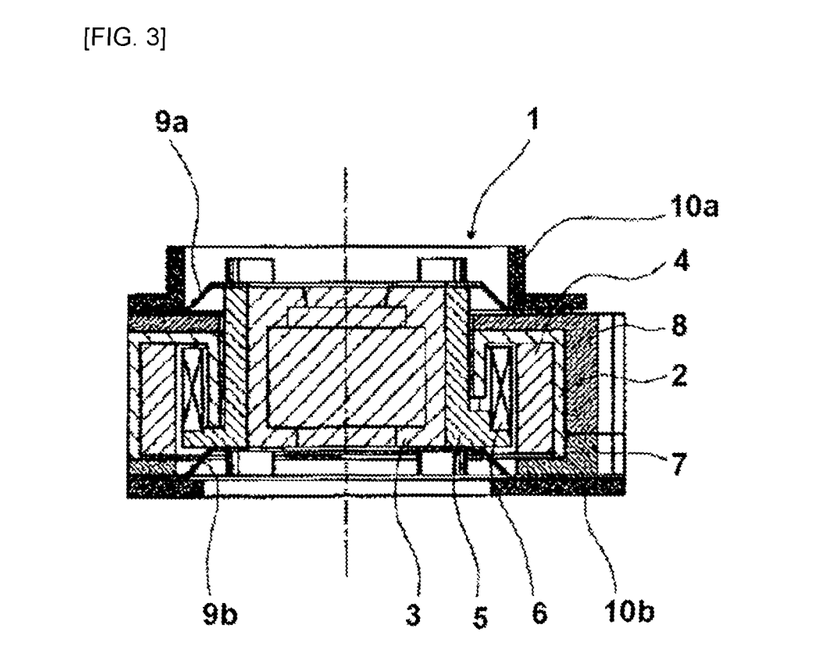
FIG. 3 is a sectional view showing the operation of the autofocus camera module of FIG. 1.

FIG. 1 is a sectional view showing one example of the autofocus camera module according to the present invention; FIG. 2 is an exploded perspective view of the autofocus camera module of FIG. 1; and FIG. 3 is a sectional view showing the operation of the autofocus camera module of FIG. 1.

An autofocus camera module 1 comprises a U-shaped cylindrical yoke 2, a magnet 4 attached to the outer wall of the yoke 2, a carrier 5 having a lens 3 in the center position, a coil 6 mounted on the carrier 5, a base 7 on which the yoke 2 is mounted, a frame 8 supporting the base 7, two spring members 9a and 9b supporting the carrier 5 at the top and the bottom, and two caps 10a and 10b covering the top and the bottom thereof. The two spring members 9a and 9b are the same articles, which sandwich and support the carrier 5 from the top and the bottom at the same positional relationship and act as a power supply path to the coil 6. The carrier 5 moves upward by applying current to the coil 6. Note that in the present specification, the wording of the top and the bottom is arbitrarily used, which means the top and the bottom in FIG. 1 and in which the top represents the positional relationship toward a photographic subject from the camera.

The yoke 2 is a magnetic material such as soft iron, which takes the shape of a U-shaped cylinder with a closed top surface and has a cylindrical inner wall 2a and a cylindrical outer wall 2b. The ring-shaped magnet 4 is mounted (bonded) on the inner surface of the U-shaped outer wall 2b.

The carrier 5 is a molded article made of a synthetic resin having a cylindrical shape structure with a base part, which supports the lens in the center position and in which the previously molded coil 6 is bonded and mounted on the outside of the bottom thereof. The yoke 2 is fitted and integrated into the inner peripheral part of the base 7 which is a rectangular-shaped resin-molded article, and the whole yoke 2 is fixed with the frame 8 which is a resin-molded article.

The outermost peripheral parts of the spring members 9a and 9b are sandwiched by the frame 8 and the base 7, respectively, and fixed, and notch groove parts at every 120° on the inner peripheral part are fitted into the carrier 5 and fixed by heat caulking or the like.

The spring member 9b and the base 7 and the spring member 9a and the frame 8 are fixed with adhesion, heat caulking, or the like. Further, the cap 10b is attached to the bottom of the base 7, and the cap 10a is attached to the upper part of the frame 8. Thus, the spring member 9b is sandwiched and fixed between the base 7 and the cap 10b, and the spring member 9a is sandwiched and fixed between the frame 8 and the cap 10a.

One lead wire of the coil 6 is extended upward through the inside of the groove provided on the inner circumferential surface of the carrier 5 and soldered to the spring member 9a. The other lead wire is extended downward through the inside of the groove provided in the bottom of the carrier 5 and soldered to the spring member 9b.

The spring members 9a and 9b are flat springs made of the titanium-copper foil according to the present invention. The spring members 9a and 9b have spring properties, elastically urges the lens 3 toward the initial position in the optical axis direction, and, at the same time, act also as a power supply path to the coil 6. One portion of each of the peripheral parts of the spring members 9a and 9b is projected outside and works as a power supply terminal.

The cylindrical magnet 4 is magnetized in the radial (diameter) direction and forms a magnetic path using the inner wall 2a, the top surface, and the outer wall 2b of the U-shaped yoke 2 as a path, and the coil 6 is arranged in the gap between the magnet 4 and the inner wall 2a.

The spring members 9a and 9b have the same shape and are attached at the same positional relationship as shown in FIGS. 1 and 2, and therefore, the displacement of the axis when the carrier 5 moves upward can be suppressed. Since the coil 6 is manufactured by winding followed by pressing, the accuracy of the finished outer diameter is improved, and the coil 6 can be easily arranged in a predetermined narrow gap. Since the carrier 5 abuts the base 7 at its lowermost position and abuts the yoke 2 at its uppermost position, the carrier 5 works as an abutting mechanism in the vertical direction and prevents falling off.

FIG. 3 shows a sectional view when current is applied to the coil 6 to move the carrier 5 having the lens 3 upward for autofocus. When a power source is applied to the power supply terminals of the spring members 9a and 9b, current will flow into the coil 6, and upward electromagnetic force will act on the carrier 5. On the other hand, the restoring force of the two connected spring members 9a and 9b acts on the carrier 5 downward. Therefore, the upward moving distance of the carrier 5 represents the position where the electromagnetic force and the restoring force are balanced. Thus, the moving amount of the carrier 5 can be determined by the amount of current applied to the coil 6.

Since the upper spring member 9a supports the top of the carrier 5 and the lower spring member 9b supports the bottom of the carrier 5, the restoring force equally acts on both the top and the bottom of the carrier 5 and can suppress the displacement of the axis of the lens 3 to a small level.

Therefore, when the carrier 5 moves upward, a guide such as a rib is unnecessary and not used. Since there is no sliding friction by a guide, the moving amount of the carrier 5 is controlled only by the balance of the electromagnetic force and the restoring force, and smooth and accurate movement of the lens 3 has been achieved. This has achieved autofocus with little lens blurring.

Note that although the magnet 4 has been described as having a cylindrical shape, the shape is not limited to a cylindrical shape, but the magnet 4 may be composed of three or four pieces, which are magnetized in the radial direction and stuck and fixed on the inner surface of the outer wall 2b of the yoke 2.

(8) Production Method

An example of a method for producing a base material of the titanium-copper alloy according to the present invention will be described. First, an ingot is produced by melting and casting. It is preferred to basically perform the melting and casting in a vacuum or an inert gas atmosphere in order to prevent oxidation wear of titanium. If some additive elements are not melted and remain in the melting, these elements will not effectively act to improve strength. Therefore, in order to reduce the melting residue, a third element having high melting point such as Fe and Cr needs to be thoroughly stirred after being added and then held for a certain period of time. On the other hand, Ti may be added after the third element is melted since Ti relatively easily melts in Cu. Therefore, it is desirable to add, to Cu, one or more selected from the group consisting of Ag, B, Co, Fe, Mg, Mn, Mo, Ni, P, Si, Cr, and Zr and then add a predetermined amount of Ti to produce an ingot.

Subsequently, hot rolling, cold rolling 1, solution treatment, cold rolling 2, and aging treatment can be performed in this order to finish a copper alloy having desired thickness and characteristics. In order to obtain high strength, cold rolling 3 may be performed after aging treatment. The hot rolling and subsequent cold rolling 1 may be performed under the customary conditions performed in the production of a titanium-copper alloy, and there are no particularly required conditions. Further, the solution treatment may also be performed under customary conditions, for example, under a condition of a temperature of 700 to 1000° C. for 5 seconds to 30 minutes.

In order to obtain high strength, it is preferred to specify the rolling reduction ratio in the cold rolling 2 to 55% or more. The rolling reduction ratio is more preferably 60% or more, further more preferably 65% or more. The upper limit of the rolling reduction ratio is not particularly specified in terms of the target strength of the present invention, but industrially, it does not exceed 99.8%.

In the aging treatment, the heating temperature is preferably set to 200 to 450° C., and the heating time is preferably set to 2 to 20 hours. If the heating temperature is less than 200° C. or more than 450° C., it will be hard to obtain high strength. Also if the heating time is less than 2 hours or more than 20 hours, it will be hard to obtain high strength.

The rolling reduction ratio in the case of performing the cold rolling 3 is preferably specified to 35% or more. The rolling reduction ratio is more preferably 40% or more, further more preferably 45% or more. If the rolling reduction ratio is less than 35%, it will be hard to obtain high strength. The upper limit of the rolling reduction ratio is not particularly specified in terms of strength, but industrially, it does not exceed 99.8%.

Note that a person skilled in the art will be able to understood that the steps of grinding, polishing, shot blasting, pickling, and the like for removing oxidized scale on the surface may be suitably performed between each of the above steps.

Examples

Hereinafter, examples of the present invention will be shown. However, these examples are provided in order to understand the present invention and its advantage better, and the present invention is not intended to be limited to these examples.

The base material of each sample has the composition containing predetermined alloy components described in Table 1 with the balance consisting of copper and unavoidable impurities. In a vacuum melting furnace, was melted 2.5 kg of electrolytic copper, and thereto were added alloying elements so that the alloy composition described in Table 1 might be obtained. This molten metal was cast into a mold made of cast iron to produce an ingot having a thickness of 30 mm, a width of 60 mm, and a length of 120 mm. This ingot was subjected to hot rolling and then processed by the following order of steps to produce a titanium-copper foil having a foil thickness of 0.03 mm. Note that in Comparative Examples 2 and 3, the rolled copper foil of pure copper (manufactured by JX Nippon Mining & Metals Corporation: copper alloy number C1100, thickness: 0.035 mm) was used.

(1) Hot rolling: The ingot was heated at 950° C. for 3 hours and rolled to a thickness of 10 mm.

(2) Grinding: The oxidized scale produced in the hot rolling was removed with a grinder. The thickness after grinding was 9 mm.

(3) Cold rolling 1: The rolling reduction ratio was adjusted in consideration of the rolling reduction ratio in the cold rolling 2 so that the final foil thickness might be obtained.

(4) Solution treatment: The material was charged into an electric furnace heated to 800° C., maintained for 5 minutes, and then rapidly cooled by putting the sample into a water tank.

(5) Cold rolling 2: The material was rolled at a rolling reduction ratio of 98%.

(6) Aging treatment: The material was heated to 300° C. and heated for 2 hours in an Ar atmosphere.

The surface of each of the resulting titanium-copper foil or rolled copper foil for comparison was cleaned by degreasing and pickling and then subjected to plating treatment using the plating composition and thickness described in Table 1. The Ni plating layer (plating composition, Ni: 100) was formed under the following electroplating conditions.

Ni ion: 20 g/L
pH: 3.0
Bath temperature: 50° C.
Current density: 5 A/dm$^2$
Time: Adjusted by plating thickness The Co—Ni plating layer (plating composition, Co: 60, Ni: 40) was formed under the following electroplating conditions.

Ni ion: 10 g/L
Co ion: 10 g/L
pH: 2.5
Bath temperature: 50° C.
Current density: 5 A/dm$^2$
Time: Adjusted by plating thickness Note that the plating composition in Table 1 is a theoretical value, and unavoidable impurities are present in the actual plating composition. The plating thickness was measured using a fluorescent X-ray thickness meter described above.

<1. Solder Adhesion Strength Test>

Each sample foil after plating (no plating in Comparative Examples 1 and 3) and pure copper foil (C1100 manufactured by JX Nippon Mining & Metals Corporation, foil thickness: 0.035 mm) were joined through Pb free solder (ESC M705) manufactured by Senju Metal Industry Co., Ltd., and the adhesion strength of the joined sample was measured by performing 180° peeling test at a rate of 100 mm/min using a precision load measuring instrument (MODEL-1605NL) manufactured by AIKOH ENGINEERING CO., LTD. Specifically, a strip having a width of 15 mm and a length of 200 mm was prepared from the sample foil;

a strip having a width of 20 mm and a length of 200 mm was prepared from the pure copper foil; and the area of 30 mm×15 mm in the central part in the length direction of these strips was joined at a joining temperature of 245° C.±5° C. The adhesion strength was measured both before and after heating, and the heating condition was set to a temperature of 85° C. for 100 hours. Note that the thickness of the pure copper foil is satisfactory as long as it is close to the thickness of the sample foil to be evaluated, but it is preferably 0.02 mm to 0.05 mm, and pure copper foil having a thickness of 0.035 mm was used in the present examples.

<2. Solder Wettability Test>

A strip test piece having a width of 10 mm and a length of 50 mm was taken from each sample foil and washed in a 10% sulfuric acid aqueous solution. The test piece was immersed to a depth of 12 mm for 10 seconds in a solder bath (Pb free solder) heated to 250° C.±3° C. using rosin-ethanol flux and measured for the solder wettability by a meniscograph method in accordance with JIS-C60068-2-54: 2009 (old JIS-C0053). In this test, solder wets up a material having good wettability. Therefore, a material in which solder has wetted up was evaluated as "good", and a material which repels solder was evaluated as "bad".

<3. Combined Environmental Test>

The degree of discoloration when each sample foil was maintained in a constant temperature bath at a temperature of 85° C. and a relative humidity of 85% for 100 hours was investigated. A sample in which the degree of discoloration was smaller than that of a bare material (Comparative Example 1) was evaluated as "good".

<4. Linearity of Etching>

Each sample foil was etched using 37% by mass aqueous ferric chloride having a Baume degree of 40° to form a linear circuit having a line width of 100 μm and a length of 150 mm. The circuit was observed (observation length: 200 μm) using a scanning electron microscope (manufactured by Hitachi, Ltd., S-4700), and a circuit in which the difference between the maximum circuit width and the minimum circuit width was less than 4 μm, from 4 to 10 μm, or more than 10 μm was evaluated as "very good", "good", or "bad", respectively.

<5. Strength Test (0.2% Yield Strength)>

When the sample foil after plating of Examples 1 and 5 were measured for the 0.2% yield strength in the direction parallel to the rolling direction in accordance with the measuring method described above using a tensile testing machine, the 0.2% yield strength was found to be 1420 MPa and 1417 MPa, respectively.

The results are shown in Table 1. Table 1 shows that solder adhesion can be improved by performing Ni plating. It is understood that in the case of Co—Ni alloy plating, solder adhesion can be improved while securing the linearity of etching. Further, it is also understood that solder adhesion is significantly improved by setting plating thickness to 0.03 μm or more. An example in which single Co plating has been performed is not reported. However, since solder adhesion tends not to be reduced but rather tends to be increased by incorporating Co into Ni plating and it is obvious that etching properties are improved by adding Co, a person skilled in the art will be able to understand that a titanium-copper alloy having not only improved solder adhesion targeted by the present invention but also having etching properties can be obtained even when single Co plating is employed.

Comparative Example 2 and Comparative Example 3 in which pure copper foil and Ni-plated pure copper foil were used, respectively, show that these materials are unsuitable as a spring material for AFM because they have low strength.

The material of Comparative Example 4 having a Ti concentration of more than 5.0% by mass was not able to be evaluated since a crack occurred during rolling.

TABLE 1

| | Alloy component in base material (% by mass) | Plating composition (% by mass) | Plating thickness (μm) | Solder adhesion strength (N) Before heating | Solder adhesion strength (N) After heating | Solder wettability | Combined environmental test (resistance to discoloration) | Etching linearity |
|---|---|---|---|---|---|---|---|---|
| Example 1 | Ti: 3.2 | Ni: 100 | 0.025 | 0.5 | 0.8 | good | good | very good |
| Example 2 | Ti: 3.2 | Ni: 100 | 0.06 | 9.3 | 5.4 | good | good | good |
| Example 3 | Ti: 3.2 | Ni: 100 | 0.14 | 15.3 | 19.7 | good | good | bad |
| Example 4 | Ti: 3.2 | Ni: 100 | 0.21 | 16.5 | 17.6 | good | good | bad |
| Example 5 | Ti: 3.2 | Co: 60 Ni: 40 | 0.02 | 0.5 | 0.8 | good | good | very good |
| Example 6 | Ti: 3.2 | Co: 60 Ni: 40 | 0.03 | 6.6 | 7.8 | good | good | very good |
| Example 7 | Ti: 3.2 | Co: 60 Ni: 40 | 0.1 | 21.1 | 24.3 | good | good | very good |
| Example 8 | Ti: 3.2 | Co: 60 Ni: 40 | 0.5 | 19.8 | 20.6 | good | good | good |
| Example 9 | Ti: 3.2 | Co: 60 Ni: 40 | 1.0 | 18.5 | 22.1 | good | good | good |
| Example 10 | Ti: 1.8 | Co: 60 Ni: 40 | 0.1 | 19.7 | 22.5 | good | good | very good |
| Example 11 | Ti: 3.2 Fe: 0.2 | Co: 60 Ni: 40 | 0.1 | 19.5 | 22.7 | good | good | very good |
| Example 12 | Ti: 3.2 Cr: 0.3 | Co: 60 Ni: 40 | 0.1 | 20.3 | 23.2 | good | good | very good |
| Example 13 | Ti: 3.2 Ag: 0.1 Co: 0.1 Ni: 0.1 | Co: 60 Ni: 40 | 0.1 | 20.9 | 24.1 | good | good | very good |

TABLE 1-continued

| | Alloy component in base material (% by mass) | Plating composition (% by mass) | Plating thickness (μm) | Solder adhesion strength (N) | | Solder wettability | Combined environmental test (resistance to discoloration) | Etching linearity |
|---|---|---|---|---|---|---|---|---|
| | | | | Before heating | After heating | | | |
| Example 14 | Ti: 3.2<br>Si: 0.05<br>Ni: 0.1<br>Zr: 0.1<br>Mg: 0.1 | Co: 60<br>Ni: 40 | 0.1 | 20.4 | 23.2 | good | good | very good |
| Example 15 | Ti: 3.2<br>P: 0.05<br>Ni: 0.1<br>Mn: 0.05 | Co: 60<br>Ni: 40 | 0.1 | 19.8 | 23.0 | good | good | very good |
| Example 16 | Ti: 3.2<br>B: 0.05<br>Mo: 0.5<br>Cr: 0.4 | Co: 60<br>Ni: 40 | 0.1 | 20.1 | 23.6 | good | good | very good |
| Comparative Example 1 | Ti: 3.2 | No plating | — | 0.4 | 0.7 | good | bad | very good |
| Comparative Example 2 | Rolled copper foil | Ni: 100 | 0.1 | 14.7 | 18.3 | good | good | bad |
| Comparative Example 3 | Rolled copper foil | No plating | — | 24.6 | 26.3 | good | good | very good |
| Comparative Example 4 | Ti: 5.2 | | | Crack occurred by rolling | | | | |

REFERENCE SIGNS LIST

1 Autofocus camera module
2 Yoke
3 Lens
4 Magnet
5 Carrier
6 Coil
7 Base
8 Frame
9a Upper spring member
9b Lower spring member
10a, 10b Cap

What is claimed is:

1. A titanium-copper alloy comprising a base material and a plating layer provided on a surface of the base material, wherein the base material contains 1.5% by mass to 5.0% by mass of Ti, with a balance consisting of copper and unavoidable impurities, and the plating layer is selected from the group consisting of (a) a Co plating layer and (b) a Co—Ni alloy plating layer having a Co content of at least 20% by mass, wherein a thickness of the plating layer is 0.02 μm to 1.0 μm, and a solder adhesion strength before heating measured by joining a strip of the titanium-copper alloy with a solder on an area of 30 mm×15 mm at a joining temperature of 245° C.±5° C. and performing a 180° peeling test is 0.5 N to 21.1 N.

2. The titanium-copper alloy according to claim 1, wherein the plating layer is a Co—Ni alloy plating layer.

3. The titanium-copper alloy according to claim 2, wherein the content of Co in the Co—Ni alloy plating layer is at least 50% by mass.

4. The titanium-copper alloy according to claim 1, wherein the thickness of the plating layer is at least 0.03 μm.

5. The titanium-copper alloy according to claim 1, wherein the base material is in a form of foil having a thickness of 0.1 mm or less.

6. A method for connecting a titanium-copper alloy to a conductive member, the method comprising the steps of: subjecting the titanium-copper alloy according to claim 5 to shape-processing by etching; and joining the resulting shape-processed article of the titanium-copper alloy to a conductive member by soldering at a portion having the plating layer.

7. An electronic component comprising the titanium-copper alloy according to claim 1.

8. A joined body of the titanium-copper alloy according to claim 1 and solder, wherein the joined body has a joined part with solder on a surface of the plating layer of the titanium-copper alloy.

9. An autofocus module comprising the titanium-copper alloy according to claim 1 as a spring material.

10. An autofocus camera module comprising: a lens; a spring member made of a titanium-copper alloy according to claim 1 which elastically urges the lens toward an initial position in an optical axis direction; and an electromagnetic drive means which generates electromagnetic force to resist the urging force of the spring member, thereby capable of driving the lens in the optical axis direction, wherein the electromagnetic drive means has a coil, and the spring member is joined to the coil by soldering at a portion having the plating layer.

11. A titanium-copper alloy comprising a base material and a plating layer provided on a surface of the base material, wherein the base material contains 1.5% by mass to 5.0% by mass of Ti, containing at least one element selected from the group consisting of Ag, B, Co, Fe, Mg, Mn, Mo, Ni, P, Si, Cr, and Zr in a total amount of no more than 1.0% by mass, with a balance consisting of copper and unavoidable impurities, and the plating layer is selected from the group consisting of (a) a Co plating layer and (b) a Co—Ni alloy plating layer having a Co content of at least 20% by mass, wherein a thickness of the plating layer is 0.02 μm to 1.0 μm.

* * * * *